INVENTOR
MORGAN G. HUNTINGTON

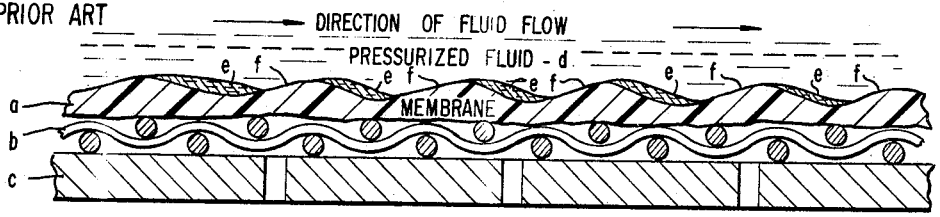
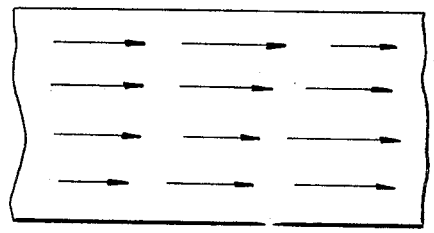
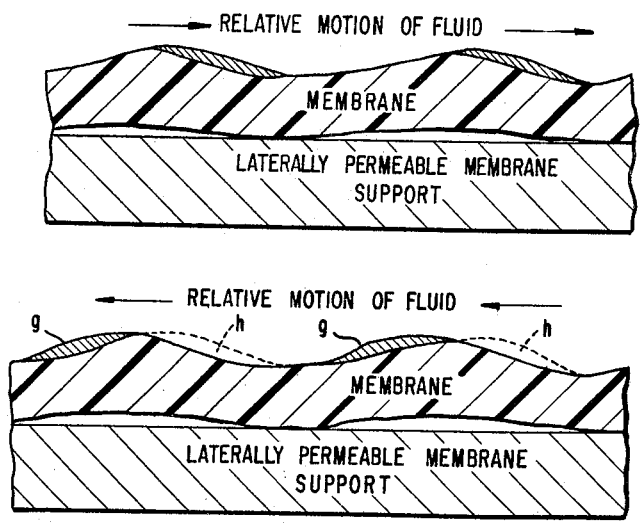
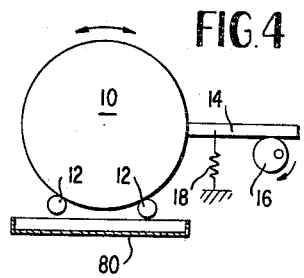
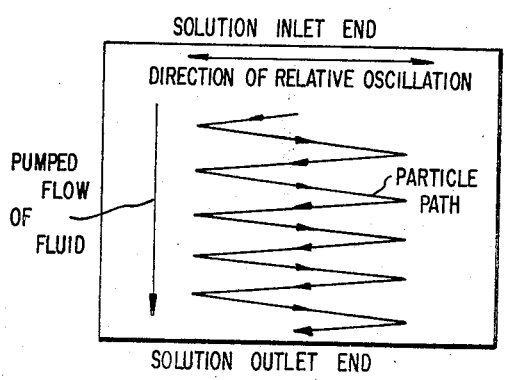
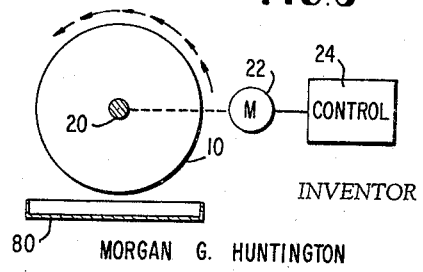

FIG. 7
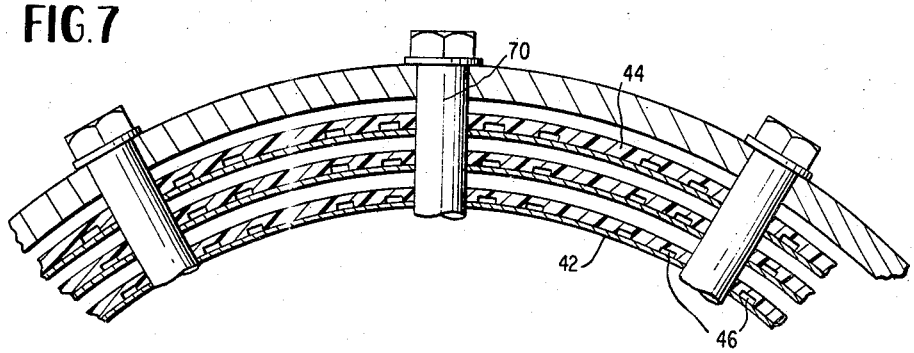
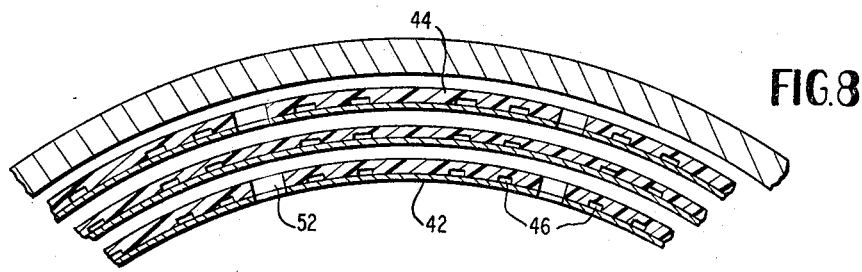
FIG. 8
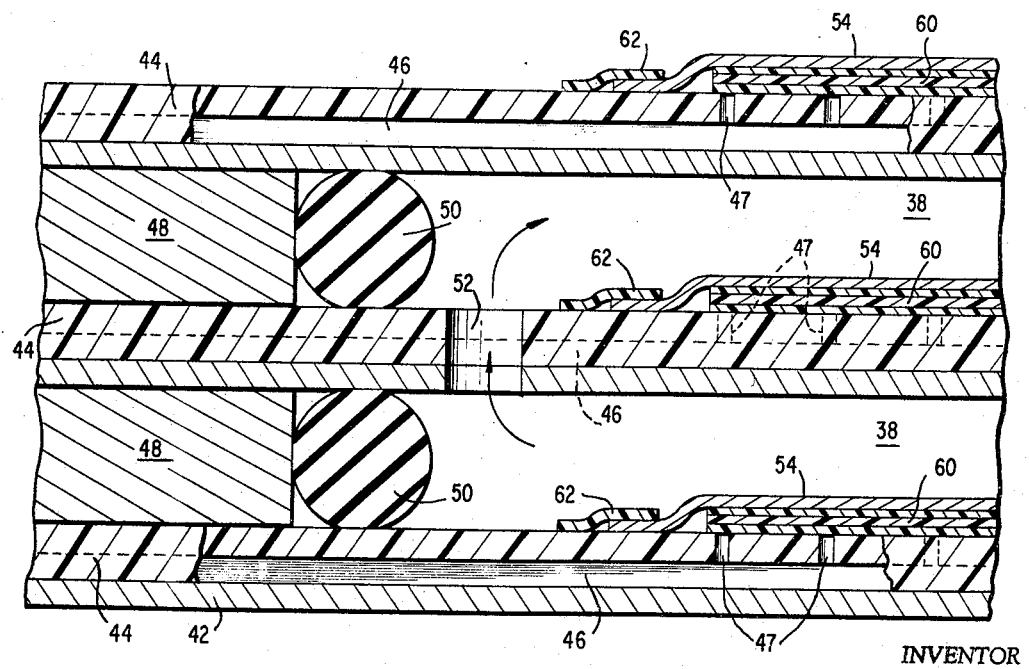
FIG. 9
INVENTOR
MORGAN G. HUNTINGTON United States Patent Office 3,491,021
Patented Jan. 20, 1970

3,491,021
METHOD AND APPARATUS FOR NON-CYCLIC
CONCENTRATION OF SOLUTION-SUSPENSION
Morgan G. Huntington, P.O. Box 81,
Galesville, Md. 20765
Filed Oct. 18, 1967, Ser. No. 676,157
Int. Cl. B01d 35/20
U.S. Cl. 210—19                    10 Claims

ABSTRACT OF THE DISCLOSURE

A method for non-cyclic pressure filtration of solution-suspension through a cylindrically supported membrane utilizes reciprocating angular acceleration of the membrane and its support relative to an inertially positioned solution-suspension to minimize the boundary layer concentration of solute and to prevent the accumulation of a filter cake upon the membrane surface. An apparatus for practicing the method includes an annular cylindrical housing that encloses a plurality of spaced and individually sealed concentric assemblies which carry membranes on laterally permeable supports between concentric cylindrical pressure shells. The apparatus is oscillated about a longitudinally central axis by reciprocating angular acceleration relative to the inertially positioned solution-suspension to produce an alternating shearing force between the fluid boundary layer and the membrane surface.

BACKGROUND OF THE INVENTION

Field of invention

This invention relates to a method and apparatus for pressurized filtration wherein turbid liquids are clarified in a unique, non-cyclic, continuous manner and no filter cake accumulates. More particularly, this invention relates to a method and apparatus for causing, by reciprocating acceleration of a filter membrane relative to inertially positioned solution-suspension, an alternating differential motion between the filter membrane and the solution-suspension, thus repeatedly and rapidly interrupting the formation of a stable boundary fluid layer. The alternating fluid shear so produced minimizes the concentration of solute at the surface of the membrane and effectively prevents the attachment and/or growth of particulate matter upon the membrane and upon the interior surface of the containing vessel.

Description of prior art

It has long been known that membrane filters could be used to reliably sterilize solutions and separate particles even finer than the smallest virus. By forced passage through such fine ultrafilters, organically contaminated water can, in conjunction with suitable coagulation, be made so pure and free of pyrogens as to be usable for intraveneous injections. Such membrane filters have provided a reliable means for detecting contaminates in water and have been for many years a standard method of water analysis. The major limitation of water purification on a large scale by ultrafiltration has been the fact that all filter media have quickly become blinded and the through-flow rate of filtrate rapidly approached zero.

Large scale purification of water by ultrafiltration, as wonderfully effective as the laboratory has proven it to be, has not been commercialized because there has previously been known no satisfactory means for maintaining adequate permeability of the membrane filter.

Dr. Sidney Loeb and others at the University of California at Los Angeles have developed high-flow, durable membrane ultrafilters which concentrate electrolytic, as well as organic solutes at the membrane surface, and which effectively desalinate saline solutions when the solution pressure exceeds the osmotic pressure difference between solution and filtrate. Although the successful, large scale desalination of saline waters would appear at first impression to be simply a matter of adequately supporting this known membrane, while exerting a solution pressure somewhat greater than osmotic pressure, a number of difficulties have arisen which have prevented commercialization of this known "reverse osmosis" or "ultrafiltration" principle.

Major problems which present themselves when such ion retarding membranes are employed for purifying water by pressurized ultrafiltration include the following:

(a) It is inherent in ion retarding membrane filtration that solute must concentrate at the desalinating membrane surface as solvent is forced therethrough. Experimentally, employing high-flow membranes, it has been found that boundary layer concentration of solute ("concentration ploarization") raises the osmotic pressure several fold above the osmotic pressure of the bulk solution. Moreover, the rate of diffusion of solute through such a membrane is a direct function of its difference in concentration across the membrane. Therefore, the effective desalination becomes less and less with increased concentration of solute at the phase interface. Moreover, the rate of duffsion of concentrated solute from the boundary layer back into the bulk solution as compared to the rate of diffusion through the membrane constitutes an inherent limitation of desalination by such a process under relatively static conditions.

Although high velocity unidirectional turbulent flow of solution over the membrane surface does tend to lessen the concentration polarization or osmotic overpressure, high velocity flow against the membrane surface is wasteful of pumping power, erodes the active membrane surface, and markedly shortens the effective life of the membrane. Moreover, unidirectional turbulent flow does not completely remove the stagnant boundary layer except in localized spots. In fact, it is well known that high velocity turbulent flow can cause separation of streamlines from the bounadary layer, resulting in increased thickness and stagnation of the fluid layer at the membrane surface.

(b) In conventional filtration systems, particulate matter suspended in the solution being filtered impinges upon or within the interstices of the filter medium and accumulates as a filter cake thereon, progressively reducing permeability of the filter. A particular adverse effect of surface fouling of desalinating membranes is interference with the diffusion of concentrated solute from the membrane surface back into the bulk solution. Prefiltration of the solution does not by itself solve the surface fouling problem in the use of desalinating membranes because trivalent ions coagulate colloids to form sludge. Also, common ion concentration causes the precipitation of magnesium and calcium salts. In addition, iron hydroxide is readily precipitated from ferruginous waters by certain bacteria and by oxidation alone. Again, even very high velocity unidirectional flow along the membrane surface does not prevent its being coated by solid matter because of boundary layer stagnation that results from the separation of streamlines. Only in artificial solutions of distilled water and certain salts is unidirectional turbulent flow over ultrasmooth membrane reasonably effective in lowering the osmotic overpressure due to boundary layer concentration. However, such unidirectional turbulent flow alone is inadequate over naturally rough membranes and the effectiveness rapidly diminishes when particulate matter is present in the solution because solid material inevitably accumulates upon the membrane surface. Probably the least desirable effect of high velocity turbulent flow is the spotty surface erosion of the all-important membrane surface film of hyperfilters with the resulting deterioration of their ion retarding quality.

(c) Rapid filtration and desalination through osmotic type membrane filters requires the evertion of substantial solution pressure above the osmotic pressure and all previously designed apparatus is necessarily heavy and expensive to fabricate. Conventional pressurized filtration vessels that employ a cylindrical configuration to resist hoop stress have heavily bolted, forged ends to withstand the considerable longitudinal pressure.

(d) Mounting, testing, inspecting and repairing membranes is usually expensive and difficult. In all of the hyperfiltration apparatus so far developed, the inspection of mounted membranes without irreparably breaking pressure seals is exceedingly difficult or impossible, thus necessitating the installation of essentially perfect films which are prohibitively expensive to manufacture.

SUMMARY OF THE INVENTION

This invention solves the problem set forth above at (a) by repeatedly interrupting the formation of a stable boundary layer. This is accomplished in the method and apparatus of this invention by rapidly producing and reversing a relative motion between the membrane surface and the solution-suspension adjacent thereto by reciprocating angular acceleration, utilizing the inertia of the pressurized solution-suspension that is confined within annular spaces between concentric membrane supports. Furthermore, alternating interfering shear within the boundary layer is produced without the use of high velocity errosive flow and without interruption of the main stream pumped flow of solution-suspension. Simultaneously, the method and apparatus of this invention solves the problem set forth above at (b) by repeatedly interrupting the tendency to form a stable boundary layer of fluid and thereby retain, in relatively homogeneous suspension, all particulate matter. This invention introduces a novel, nondestructive reciprocating angular acceleration of the membrane relative to the inertially positioned solution-suspension which is entirely effective and no filter cake whatever forms upon the membrane surface.

This invention provides a relatively lightweight apparatus in solving the problem outlined in paragraph (c) above by elimianting all longitudinal bolts and both ends that are typical of a conventional enclosing pressure vessel. All longitudinal stress is transferred by radial pins in shear to the membrane support assemblies and to the inner and outer concentric pressure shells. This arrangement minimizes the weight and the cost of the pressurized filtration system.

In solving problem (d) above, this invention also provides a convenient and unique system for mounting and for sealing membranes so that they can be tested at operating pressure, then inspected, repaired and replaced within the assembly without lessening the integrity of seals between the pressurized solution-suspension and the filtrate. The usual small imperfections commonly appearing in such plastic membrane can be tolerated because of the ease of detection and repair following a period of pressurized operation. Therefore, in use of this invention, expensive, perfectly manufactured membranes are not essential.

In the method of this invention, a pressurized solution-suspension is applied to one side of a cylindrically mounted membrane filter and filtrate is collected through a laterally permeable support on the other side of the membrane filter without the accumulation of any filter cake upon the membrane surface, while the entire assembly is subjected to reciprocating angular acceleration relative to the inertially positioned solution-suspension. The relative reciprocating motion is caused by either oscillating the apparatus about its longitudinal axis or by cyclically altering the angular velocity of unidirectional rotation, utilizing the inertia of the pressurized solution-suspension to produce motion relative to the membrane surface.

In the apparatus of this invention, a housing is defined by a single open-ended cylinder as the outside pressure shell and by a single open-ended cylindrical inside pressure shell of smaller diameter, concentrically positioned, which also serves as a laterally permeable, radially impervious membrane support. The annular space between the inner and outer open-ended pressure shells encloses a plurality of concentrically spaced cylindrical, laterally permeable but radially impervious membrane supports mounting membrane filters. The concentric membrane support assemblies are sealed against the solution pressure at each end by O-rings filling the annular spaces. The longitudinal thrust of the pressurized solution-suspension against the O-ring seals is transfered through back-up rings to radial pins that penetrate all of the concentric membrane supports and the inner and outer cylindrical housings. The radial pins that are necessarily in shear between each O-ring seal back-up ring and any two adjacent concentric cylinders, transfer the imposed shear stress equally to each of the two adjacent membrane supports. The inner and outer cylindrical housing, likewise, bear only one-half of the longitudinal stress on the O-ring in contact, thus eliminating the need for housing end enclosures and for the conventional longitudinal bolting.

BRIEF DESCRIPTION OF THE DRAWINGS

FIGURE 1–A is a greatly enlarged, diagrammatic sectional view of a suitably supported and backed membrane filter taken parallel to unidirectional flow of pressurized solution-suspension relative to the membrane surface that is typical of prior art, showing a stable boundary layer caused by the parting of streamlines under unidirectional turbulent flow.

FIGURE 1–B is an enlarged diagrammatic plan view schematically showing unidirectional flow of pressurized solution-suspension over an area of suitably supported membrane filter surface that is typical of prior art.

FIGURE 2–A is a greatly enlarged diagrammatic sectional view of a suitably supported and backed membrane filter taken parallel to the plane of oscillation and illustrates the method of this invention by showing the momentary formation of a fluid boundary layer as the membrane and support are oscillated to the left, relative to the inertial position of the superimposed pressurized solution-suspension.

FIGURE 2–B is similar to FIGURE 2–A except that it illustrates the method of this invention by showing how the fluid boundary layer of FIGURE 2–A is displaced into the bulk solution as the membrane and its laterally permeable support are oscillated to the right, relative to the inertial position of the superimposed pressurized solution-suspension.

FIGURE 3 is an enlarged diagrammatic plan view of a suitably supported membrane filter showing the relative path of a particle suspended in the inertially positioned pressurized solution as it is moved from the inlet toward the outlet over the membrane filter surface in the practice of this invention.

FIGURE 4 is a diagrammatic illustration of one type of drive for achieving reciprocating angular acceleration of the membrane.

FIGURE 5 is a diagrammatic illustration similar to FIGURE 4 of another embodiment of a drive for achieving reciprocating angular acceleration.

FIGURE 7 is a fragmental sectional view taken along line 7—7 of FIGURE 6.

FIGURE 8 is a fragmental sectional view taken along line 8—8 of FIGURE 6.

FIGURE 9 is an enlarged, longitudinal sectional view of a membrane support assembly illustrating a method of sealing ends of the membrane and method of sealing pressurized solution between concentric membrane supports.

DETAILED DESCRIPTION OF THE PREFERRED EMBODIMENTS

Figure 6:
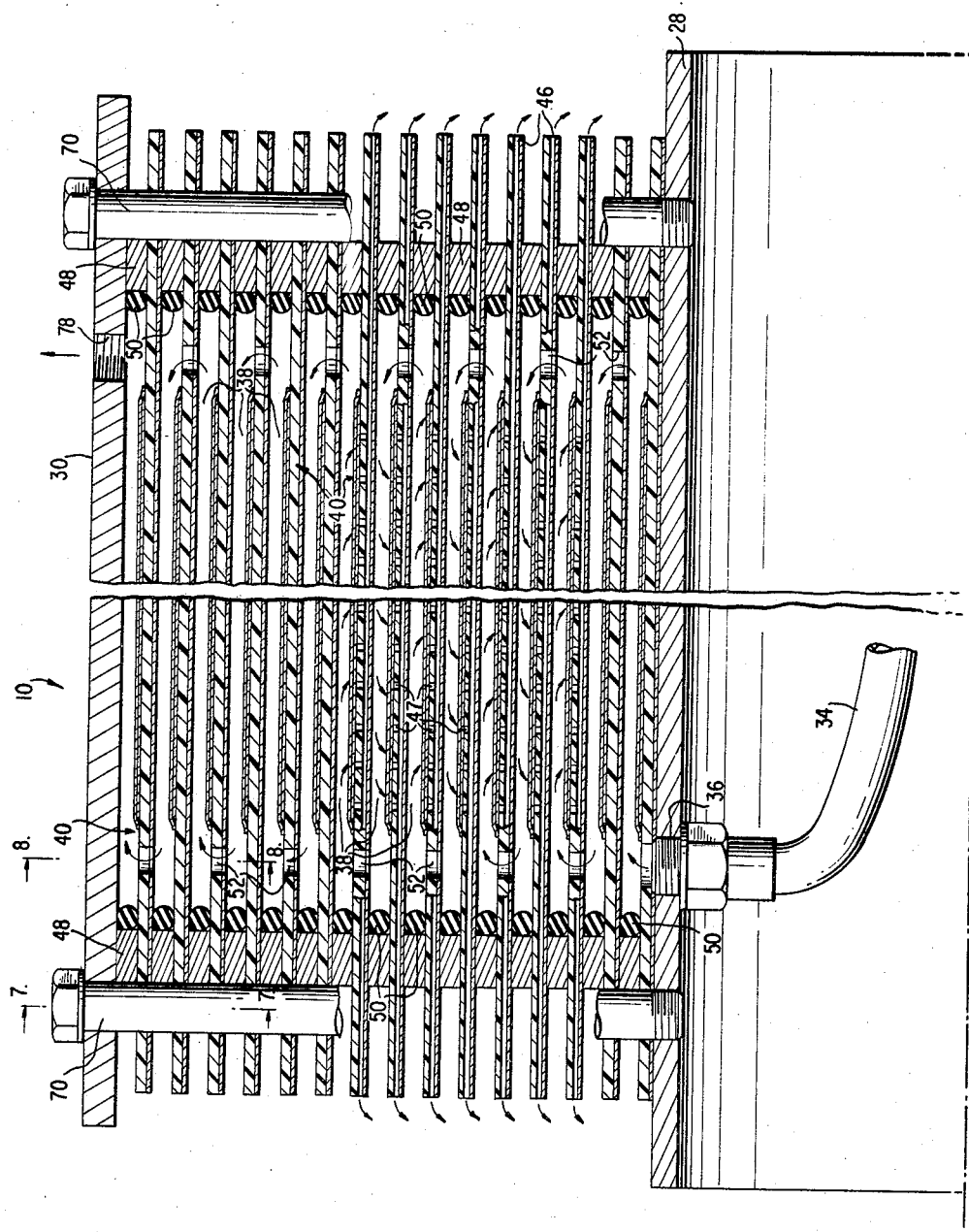
FIGURE 6 is a longitudinal axial sectional view of the apparatus of this invention showing flow paths of pressurized solution-suspension and of filtrate.

FIGURES 1-A and 1-B are diagrammatic illustrations of the prior art of high pressure, ultrafiltration, commonly known as reverse osomsis, wherein unidirectional motion of pressurized solution-suspension relative to the membrane surface is commonly employed to minimize the concentration of solute at the membrane surface.

FIGURE 1-A illustrates by a highly enlarged, diagrammatically sectionalized view, how a membrane filter surface $a$ is deformed under hydraulic pressure by conformance to the underlying laterally permeable support $b$. In practice and under an imposed solution-suspension pressure of several hundred pounds per square inch, the membrane surface is by no means mechanically smooth and must inevitably have small projections $f$ and depressions as shown in FIGURE 1-A. FIGURE 1-A also illustrates how areas of fluid $e$ stagnate as relative fluid motion begins past the membrane surface. As the relative velocity of fluid motion is increased, the stagnant fluid layer at the phase interface thickness to a maximum with initial separation of streamlines. As the relative fluid velocity is further increased into the turbulent range, the boundary layer thickness decreases until the rougher protuberances $f$ extend into the turbulent region and receive the direct impact of the fluid and the suspended matter, resulting in rapid abrasion of parts of the membrane surface.

FIGURES 2-A, 2-B and 3 illustrate diagrammatically the method of this invention and show the improvement over the prior art of FIGURES 1-A and 1-B.

When a fluid having a small viscosity is started into motion relative to a solid surface, the flow is essentially irrotational in the first instant. Since the fluid at the phase interface must have zero velocity relative to the boundary, there is initially a very sharp velocity gradient, which sets up shear forces in a real fluid. The fluid layer which has had its velocity affected by the boundary shear is called the "boundary layer." As is shown in FIGURE 2-A, in flow around protuberances, the boundary layer has minimum thickness at the upstream side and reaches maximum thickness on the downstream side due to the retarding action of the boundary shear.

FIGURE 2-B diagrammatically illustrates the instant displacement of thickened, stagnant boundary layer by the bulk solution-suspension as the direction of fluid motion relative to the solid surface is reversed (preferably but not necessarily) before separation of streamlines occurs and before the relative velocity of turbulent flow is reached.

Diagrammatically showing the method of this invention, FIGURE 3 depicts the path of progession of a particle suspended in the inertially positioned solution-suspension as it is pumped from inlet toward the outlet, over the membrane surface. The distance per unit time traversed from inlet to outlet is short when compared to the distance per unit time traversed relative to the membrane surface parallel to the planes of oscillation.

FIGURE 4 is a diagrammatic illustration of one drive arrangement for driving an apparatus housing 10, rigidly mounting a cylindrical membrane therein, in an oscillatory manner. In this case, the housing 10 would be mounted on rotary supports 12 and have a rigid arm 14 attached thereto. An eccentric or cam 16 is driven and is held in contact with arm 14 by a spring 18. Obviously, rotation of eccentric will oscillate the cylindrical housing 10 and the membrane to accomplish the reciprocating angular acceleration illustrated in FIGURES 2-A and 2-C.

FIGURE 5 shows another arrangement for accomplishing reciprocating angular acceleration although in this case, the drive is unidirectional with a cyclically varying speed as indicated by the arrows above the apparatus housing 10. The housing 10 is mounted on a central shaft 12 having suitable bearings and axial fluid takeoff and inlet means (not shown) and is driven by a variable speed motor 22 with a suitable control 14 therefor so that the motor or its drive can provide the cyclically varying unidirectional rotary drive for the apparatus housing 10 to accomplish the reciprocating angular acceleration.

The assembly of the preferred apparatus of this invention is shown in longitudinal section as FIGURE 6. The housing of the apparatus is comprised of an outer cylindrical pressure shell 30 which is centered about an inner pressure shell 28. No end covers in the ordinary sense are necessary to complete the pressurized housing.

Between the inner and the outer concentric cylindrical pressurized housing shells are a number of concentric assemblies 40 which support membrane filters on their convex surfaces and which divide the housed space into smaller annular spaces 38 of approximately equal thickness.

Again, referring to FIGURE 6, between each concentric membrane filter support assembly 40 and at each end is an O-ring seal 50 backed by a thrust ring 48. The thrust ring 48 is restrained by a number of radial pins 70 that penetrate from the outside pressure shell 30 through all of the membrane support assemblies 40 through the inner pressure shell 28.

The annular chambers 38 between the membrane support assemblies 40 are interconnected by passages 52 and are under substantially equal hydraulic pressure when the apparatus is in operation. The hydraulic pressure exerted against the O-ring back-up thrust rings places each radial pin 70 in shear between the thrust ring 48 and each adjacent membrane support assembly 40. The longitudinal stress of hydraulic pressure in each annular chamber is thus transmitted to the membrane supports and to the inner and outer pressure shells, each of which is in tension. Therefore, no housing ends are necessary to restrain the hydraulic force.

The concentric membrane support assemblies 40 are identical except for the inner pressure shell which serves the triple purpose of (1) supporting a membrane as well as, (2) bearing the compressive stress of the pressurized solution-suspension and (3) resisting one-half the longitudinal stress hydraulically imposed against the innermost O-ring seal. As is shown in FIGURES 7, 8 and 9, the membrane support assemblies are comprised of an inner, impervious shell 42, preferably of corrosion-resistant steel having an elastic limit in the order of 50,000 p.s.i. Covering the full length of the inner steel cylindrical shell 42 is a homogenous sleeve 44, preferably made of noncorrodible plastic that is resistant to flow under pressure. The sleeve has flutes or slots 46 in its under surface and radial perforations 47 in its central portion for passage of the filtrate. Wrapped over the underfluted, perforated sleeve 44 are two or three layers of woven material resistant to compression, such as nylon parchment, forming a laterally permeable matte 60. This laterally permeable matte 60 allows filtrate to pass from the underside of the membrane filter to the perforations in the underfluted sleeve. The perforations 47 in the underfluted sleeves are in fluid communication with the longitudinal flutes or grooves 46 which lead the filtrate beneath the O-ring seals and out each end of the membrane support assembly.

As is shown in FIGURE 9, the membrane filter is wrapped over the laterally permeable matte and sealed longitudinally and at the ends against pressurized solution-suspension by fusion, adhesion and/or by vinyl tape 62. The membrane may also be cast in cylindrical form, slipped over the supporting assembly and subsequently shrunk to fit in order to eliminate the longitudinal seal.

Solution-suspension inlet hose 34 is connected to inner shell 28 at opening 36. The outer shell 30 is tapped at 78 for connecting a hydraulic hose to carry off concentrated solution-suspension. A pan or tray 80, FIGURES 4 and 5, may be placed beneath the ends of the assembly for collecting filtrate passing out passages 46.

It is believed that the operation of the apparatus is apparent but a brief resume will be given. Solution-suspension enters through central inlet hose 34, passes through opening 36 to the annular spaces 38 which are all in fluid communication with each other via alternating openings 52. The pressurized solution-suspension is directed to the outer surface of the membrane filter 54 and the entire housing 10 is driven, as shown in FIGURES 4 and 5, to accomplish ultrafiltration by the method previously described. As the filtrate passes through membrane 54, it moves through the laterally permeable support 60, perforations 47, the longitudinal passages 46 and out the ends of the shell assembly as shown by the arrows in FIGURE 6. The filtrate may be collected in suitable receptacles 80.

Four important side effects of non-cyclic filtration by reciprocating angular acceleration are obtained. These effects are essential to the control of waterway pollution by industrial and municipal wastes. These main changes within the pressurized fluid as it is concentrated on the solution side of the membrane filter are:

(1) Nucleate precipitation occurs within the body of the concentrating bulk solution of calcium, magnesium and phosphate ions as the result of common ion concentration, coupled with the continuous surface washing action.

(2) Autogenous coagulation of colloids by trivalent ions is effected against and upon inorganic nuclei formed in (1) above.

(3) The formation of an atypical, fast settling hydrophobic sludge, as differentiated from the normal, gelatinous, hydrophilic sludge is another completely new result of the non-cyclic, ultrafiltration method.

(4) The elimination of the phosphate nutrient from sewage plant effluent and the resulting abatement of secondary stream and estuarial pollution by aquatic growth and decay are inherent characteristics of this method and also results from common ion concentration.

This method provides for purifying and clarifying water by promoting nucleate precipitation within a bulk solution through concentrating hardness and phosphate ions to the point of exceeding the solubility product, while simultaneously causing the adsorption of colloids and organic molecules upon the inorganic nuclei, thus producing a unique, fast settling, free filtering and a relatively hydrophobic sludge. This method of segregating contaminants to form a fast settling sludge within the bulk solution, while keeping the surfaces of the containing vessel clear of particulate matter, is applicable to solution concentrating processes, such as evaporation and reverse osmosis.

What is claimed is:

1. A method for non-cyclic filtration of solution-suspension through at least one cylindrically mounted membrane filter, the method comprising:
   providing an inertially positioned pressurized solution-suspension on one side of a membrane filter,
   collecting filtrate on the other side of the membrane filter, and
   simultaneously subjecting the membrane filter to reciprocating annular acceleration relative to the solution-suspension by driving the membrane filter with a repeated change in velocity relative to the solution-suspension, thereby establishing a shearing force between the solution-suspension and the membrane to prevent build-up of solute on the membrane.

2. A method as in claim 1 wherein the reciprocating angular acceleration of the membrane filter is obtained by oscillatory driving of the membrane filter.

3. A method as in claim 1 wherein the reciprocating angular acceleration is obtained by unidirectional driving of the membrane filter with cyclic changes in the speed of rotation.

4. An apparatus for non-cyclic filtration of solution-suspension through a cylindrically mounted membrane filter, the apparatus comprising:
   an outside pressure shell,
   an inside shell concentrically spaced within the outside shell,
   a plurality of concentric shell assemblies spaced between inner and outer shells defining therebetween fluid interconnected annular spaces with seals at the ends of the annular spaces,
   internally permeable membrane support means on one side of each shell assembly,
   a membrane mounted on the membrane support,
   longitudinally extending filtrate passages located between the concentric shells and the membranes, and each passage extending from below the membrane to outside the shell assembly seals.

5. An apparatus as in claim 4 further comprising radial pins interconnecting the concentric shell assemblies and compressing the seals therebetween with the stress of hydraulic pressure placing the pins in shear between adjacent shell assemblies.

6. An apparatus as in claim 4 wherein the seals are annular assemblies mounted between adjacent shell assemblies to define the longitudinal extent of the annular spaces.

7. An apparatus as in claim 4 including means for mounting the apparatus for oscillatory motion about a central axis.

8. Apparatus for non-cyclic filtration of solution-suspension comprising:
   an enclosing housing,
   means mounting the housing for oscillatory motion about a central axis,
   a plurality of concentric shell assemblies spaced apart within the housing about the central axis and sealed at the ends providing annular solution-suspension chambers,
   passages through the shell assemblies connecting the adjacent annular solution-suspension chambers,
   a laterally permeable membrane support on one side of each shell assembly,
   a membrane filter positioned over the laterally permeable membrane support,
   an axial longitudinally extending filtered liquid passage in each shell assembly extending from the edge of the membrane support and beneath the membrane to beyond the seal at the end of the shell.

9. Apparatus as defined in claim 8 further comprising thrust rings positioned outwardly of the seals, and pins extending radially through the housing and each shell assembly outwardly of the thrust rings so that hydraulic pressure places the pins in shear between each thrust ring and adjacent shell assembly.

10. An apparatus as defined in claim 8 wherein the membranes extend over the membrane support and over the surface of the shell assembly and the ends of the membranes are sealed by impermeable tapes and holding means holding the tapes to the membranes and to the shell assemblies.

(References on following page)

References Cited

UNITED STATES PATENTS

| | | | |
|---|---|---|---|
| 1,002,603 | 9/1911 | Payne | 210—49 |
| 1,945,492 | 1/1934 | Lamort | 210—19 X |
| 2,790,762 | 4/1957 | Heymann | 210—19 |
| 3,212,499 | 10/1965 | Kureski | 210—321 X |
| 3,352,422 | 11/1967 | Heden | 210—321 |
| 3,355,382 | 11/1967 | Huntington | 210—321 X |

REUBEN FRIEDMAN, Primary Examiner

F. A. SPEAR, Jr., Assistant Examiner

U.S. Cl. X.R.

210—23, 77, 321, 338

UNITED STATES PATENT OFFICE
CERTIFICATE OF CORRECTION

Patent No. 3,491,021     Dated January 20, 1970

Inventor(s) Morgan G. Huntington

It is certified that error appears in the above-identified patent and that said Letters Patent are hereby corrected as shown below:

| | |
|---|---|
| Column 2, Line 28: | "ploarization", should be --polarization-- |
| Column 2, Line 35: | "duffsion", should be --diffusion-- |
| Column 3, Line 20: | "evertion", should be --exertion-- |
| Column 3, Line 28: | "is", should be --are-- |
| Column 8, Line 2 : | "annular", should be --angular-- |

SIGNED AND
SEALED

JUL 21 1970

(SEAL)
Attest:

Edward M. Fletcher, Jr.
Attesting Officer

WILLIAM E. SCHUYLER, JR.
Commissioner of Patents